US012790124B2

(12) United States Patent
Fiedler et al.

(10) Patent No.: US 12,790,124 B2
(45) Date of Patent: Nov. 10, 2026

(54) MOTORIZED DRIVER ROLLER ASSEMBLIES, SYSTEMS, AND METHODS

(71) Applicant: INTELLIGRATED HEADQUARTERS, LLC, Mason, OH (US)

(72) Inventors: Matthew Steven Fiedler, Lebanon, OH (US); Joshua Jackiewiecz, Oxford, OH (US); Justen Pahls, Hamilton, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 603 days.

(21) Appl. No.: 18/358,717

(22) Filed: Jul. 25, 2023

(65) Prior Publication Data

US 2025/0033887 A1 Jan. 30, 2025

(51) Int. Cl.

| | |
|---|---|
| ***B65G 13/06*** | (2006.01) |
| ***B65G 1/02*** | (2006.01) |
| ***B65G 1/04*** | (2006.01) |
| ***B65G 1/137*** | (2006.01) |
| ***B65G 39/02*** | (2006.01) |

(52) U.S. Cl.

CPC ............. *B65G 13/06* (2013.01); *B65G 1/026* (2013.01); *B65G 1/04* (2013.01); *B65G 1/1376* (2013.01); *B65G 39/02* (2013.01)

(58) Field of Classification Search

CPC ........ B65G 13/06; B65G 1/1376; B65G 1/04; B65G 1/026; B65G 39/02

See application file for complete search history.

(56) References Cited

U.S. PATENT DOCUMENTS

| | | | | |
|---|---|---|---|---|
| 5,374,326 | A * | 12/1994 | Marchetti | B65B 51/067 156/468 |
| 5,551,833 | A * | 9/1996 | Marsh | B65G 57/06 414/794.3 |
| 5,784,676 | A * | 7/1998 | Iseki | G03G 15/0194 399/9 |
| 6,409,011 | B1 | 6/2002 | Ferguson | |
| 9,888,768 | B2 | 2/2018 | Weyler et al. | |
| 2006/0196198 | A1* | 9/2006 | Kim | A47B 51/00 62/131 |
| 2018/0257110 | A1* | 9/2018 | Lundahl | B65G 39/07 |
| 2020/0039743 | A1* | 2/2020 | Ambrosi | B65G 43/10 |
| 2021/0347060 | A1* | 11/2021 | Byl | B25J 19/0075 |
| 2022/0299260 | A1 | 9/2022 | Bertschi | |
| 2023/0008035 | A1* | 1/2023 | Hart | B65G 1/04 |

FOREIGN PATENT DOCUMENTS

| | | |
|---|---|---|
| JP | 2001-171806 A | 6/2001 |

* cited by examiner

*Primary Examiner* — Ernesto A Suarez
*Assistant Examiner* — Laurence R Brothers
(74) *Attorney, Agent, or Firm* — Alston & Bird LLP

(57) ABSTRACT

Methods, systems, assemblies, and/or the like are provided. In some embodiments, a system may include a frame; one or more MDR assemblies disposed on or within the frame, wherein the one or more MDR assemblies include: a roller frame; one or more drawers configured to move between an open position and a closed position, wherein the one or more drawers are fixedly attached to the frame; one or more sensing devices fixedly attached to at least one of the one or more drawers; a plurality of rollers disposed on or within the frame; and a lift mechanism operably engaged to the one or more MDR assemblies and configured to adjust the height of the one or more MDR assemblies within the frame.

14 Claims, 11 Drawing Sheets

MOTORIZED DRIVER ROLLER ASSEMBLIES, SYSTEMS, AND METHODS

TECHNICAL FIELD

The present disclosure relates generally to motorized drive roller (MDR) assemblies. In particular, it relates to MDR assemblies having dual-purpose crash detection and component status sensors for use in a lift of an automated storage and retrieval systems (ASRS).

BACKGROUND

Motorized drive rollers (MDRs) may be disposed in beds including a plurality of rollers. The MDR assemblies may be disposed on or within a lift of an automated storage and retrieval system (ASRS), such as a warehouse or distribution center. The MDR assemblies may be stacked vertically within a frame of the lift holding one or more objects. The MDR assemblies may be elevated and lowered as necessary to retrieve objects placed at different heights within the frame. However, the use of multiple MDR assemblies moving within the frame creates the risk of collision between the MDR assemblies.

Through applied effort, ingenuity, and innovation, Applicant has solved problems relating to collision prevention between MDR beds by developing solutions embodied in the present disclosure, which are described in detail below.

SUMMARY

In general, embodiments of the present disclosure provide methods, systems, assemblies and/or the like.

In accordance with various embodiments of the present disclosure, there is provided a motorized drive roller (MDR) assembly including: a roller frame; one or more drawers configured to move between an open position and a closed position, wherein the one or more drawers are fixedly attached to the roller frame; one or more sensing devices; and a plurality of rollers disposed on or within the roller frame.

In some embodiments, the one or more sensing devices include one or more photoeye sensors configured to detect a potential collision and whether the one or more drawers are in the open position or the closed position.

In some embodiments, the MDR is operably engaged with a lift mechanism configured to raise or lower the MDR to one or more elevations, and wherein the one or more sensing devices are configured to prevent the lift mechanism from raising or lowering the MDR when the one or more drawers are in the open position.

In some embodiments, the one or more sensing devices are configured to detect the sensing bracket when the one or more drawers are in the open position and configured to refrain from detecting the sensing bracket when the one or more drawers are in the closed position.

In some embodiments, when the one or more sensing devices detect the sensing bracket, the one or more sensing devices are configured to prevent the lift mechanism from raising or lowering the MDR.

In some embodiments, the plurality of rollers include one or more active drive rollers and one or more passive idler rollers, and wherein the one or more active drive rollers are configured to drive the one or more passive rollers.

In some embodiments, the one or more drawers include one or more electrical or input/output drawers.

In some embodiments, the MDR assembly includes one or more mounting plates disposed on or within the one or more drawers including one or more slots, wherein the one or more sensing devices are mounted to the one or more mounting plates, and wherein the one or more sensing devices are configured to direct one or more beams of light through the one or more slots.

According to various embodiments, there is provided a system including a frame; one or more MDR assemblies disposed on or within the frame, wherein the one or more MDR assemblies include: a roller frame; one or more drawers configured to move between an open position and a closed position, wherein the one or more drawers are fixedly attached to the frame; one or more sensing devices fixedly attached to at least one of the one or more drawers; a plurality of rollers disposed on or within the frame; and a lift mechanism operably engaged to the one or more MDR assemblies and configured to adjust the height of the one or more MDR assemblies within the frame.

In some embodiments, the one or more sensing devices include a photoeye sensor configured to detect a potential collision and whether the one or more drawers are in the open position or the closed position.

In some embodiments, the one or more MDR assemblies are operably engaged with a lift mechanism configured to raise or lower the one or more MDR assemblies to one or more elevations, and wherein the one or more sensing devices is configured to prevent the lift mechanism from raising or lowering the one or more MDR assemblies when the one or more drawers are in the open position.

In some embodiments, the system further includes a sensing bracket, and wherein the one or more sensing devices are configured to detect the sensing bracket when the one or more drawers are in the open position and configured to refrain from detecting the sensing bracket when the one or more drawers are in the closed position.

In some embodiments, when the one or more sensing devices detect the sensing bracket, the one or more sensing devices are configured to prevent the lift mechanism from raising or lowering the one or more MDR assemblies.

In some embodiments, the plurality of rollers include one or more active drive rollers and one or more passive idler rollers, and wherein the one or more active drive rollers are configured to drive the one or more passive rollers.

In some embodiments, the one or more drawers include electrical or input/output drawers.

In some embodiments, the lift mechanism includes one or more cables disposed on or within the frame and operably engaged with the one or more MDR assemblies.

In some embodiments, the one or more MDR assemblies include a first MDR assembly and a second MDR assembly, and wherein the first MDR assembly and the second MDR assembly are separated by a distance D within the frame.

According to various embodiments, there is provided a method of using a system, the method including: opening one or more drawers on one or more MDR assemblies; detecting, via one or more sensing devices, a sensing bracket; closing the one or more drawers on the one or more MDR assemblies such that the one or more sensing devices refrain from detecting the sensing bracket; elevating or lowering, via a left device, the one or more MDR assemblies within a frame.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various embodiments, a sensing device may be placed on an interior of a motorized drive roller (MDR) assembly that is disposed on or within a frame of a lift of an automated storage and retrieval system (ASRS). In some embodiments, the sensing device may be a dual-purpose sensing device configured to detect whether or not a drawer of an MDR assembly is opened or closed, as well as to detect whether a collision is about to occur with one or more other MDR assemblies.

Example MDR Assemblies and Systems

Figure 1A:
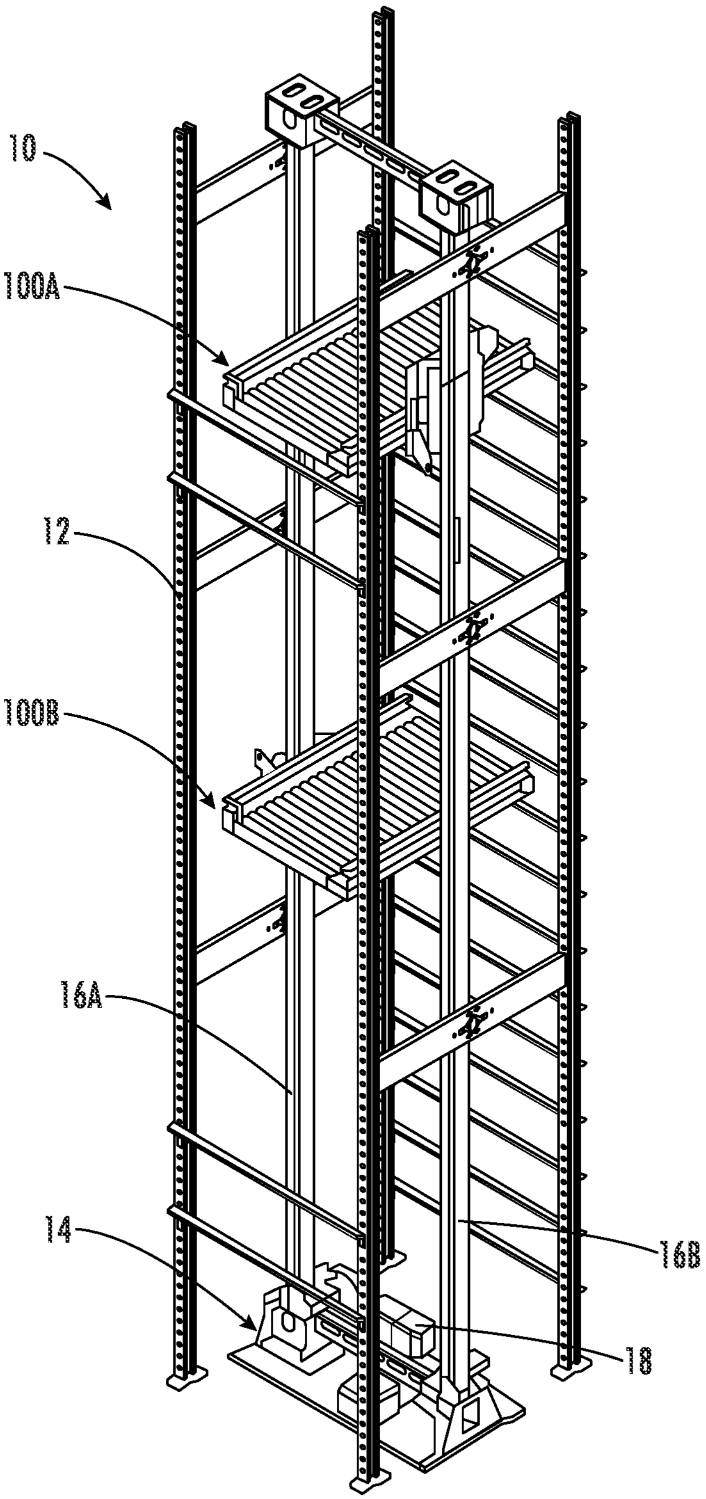
FIGS. 1A-1C show isometric views of example lift for an example automated storage and retrieval systems (ASRS) in accordance with various embodiments of the present disclosure.
Figure 1B:
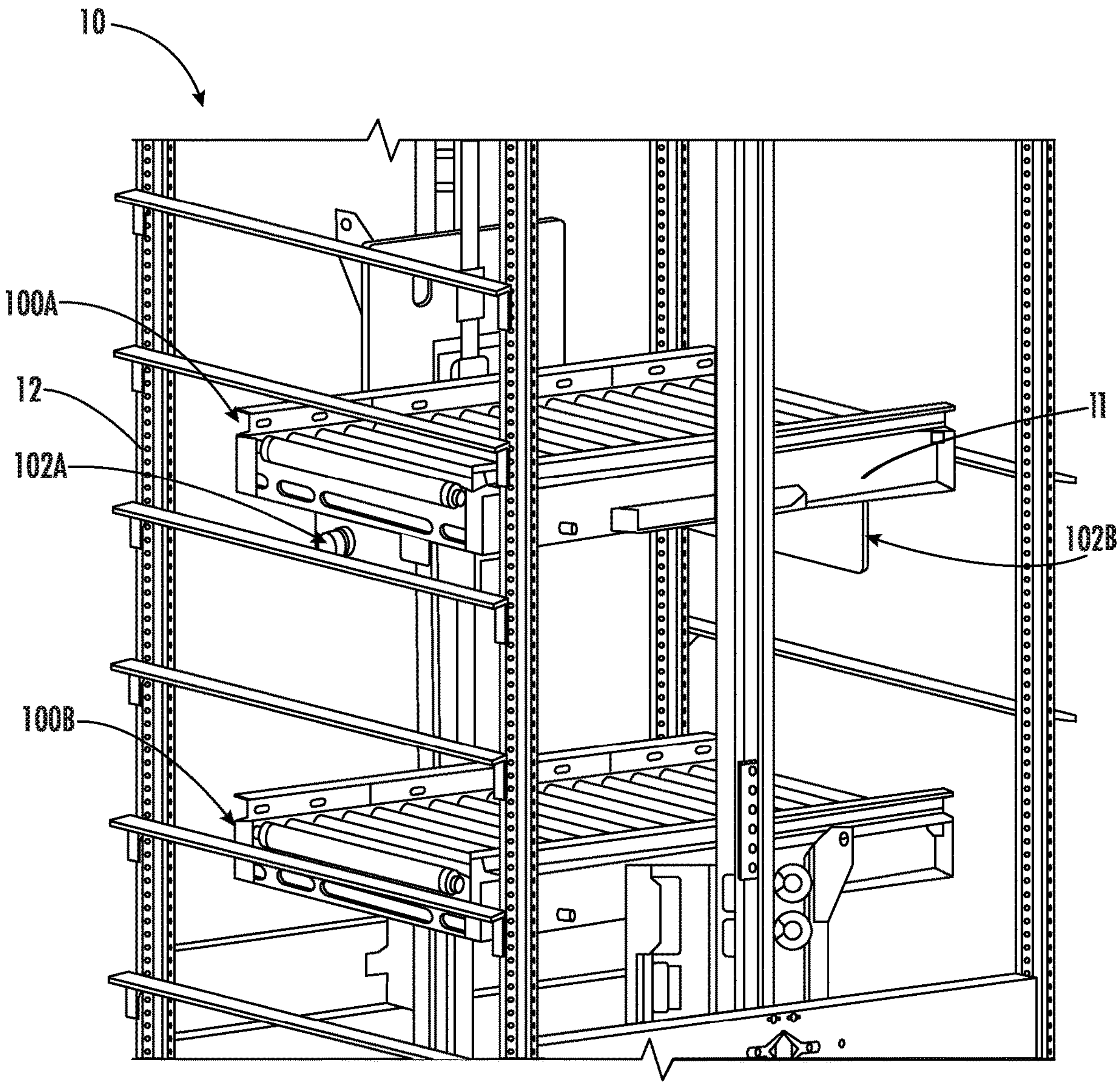
Figure 1C:
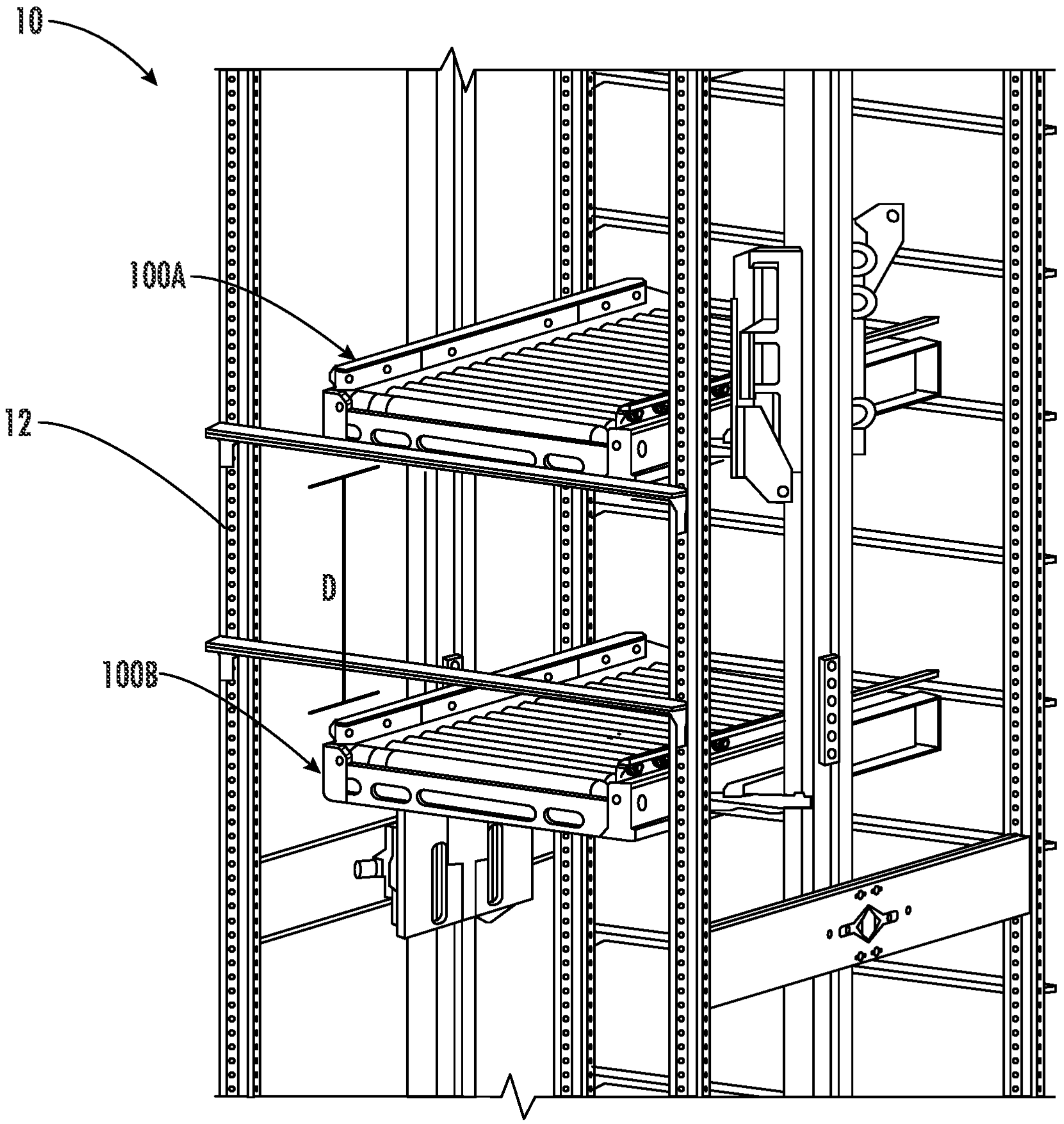

FIGS. 1A-1C show isometric views of an example lift 10 for an automated storage and retrieval system (ASRS), according to various embodiments. In some embodiments, the ASRS may be configured to store and/or retrieve one or more objects within a warehouse, distribution center, industrial environment, and/or the like. The lift 10 may be used in storing and/or retrieving one or more objects on multiple levels of the ASRS.

In some embodiments, the lift 10 may have a frame 12, on or within which may be disposed one or more motorized drive rolled (MDR) assemblies 100A (i.e., a "first" MDR assembly 100A), 100B (i.e., a "second" MDR assembly 100B). In some embodiments, the one or more objects may be disposed on or within the frame 12 of the lift 10. For example, the frame 12 may include one or more shelves on which the one or more objects may be disposed. In some embodiments, the MDR assemblies 100A, 100B may be used within the lift 10 to store and/or retrieve the one or more objects. Throughout this disclosure, unless otherwise stated, description of the MDR assembly 100A can similarly describe MDR assembly 100B. Although two MDR assemblies 100A, 100B are shown in the various figures, it will be understood that the lift 10 may include greater than or fewer than two MDR assemblies 100A, 100B, as desired, and that the description of the two MDR assemblies 100A, 100B applies similarly to three, four, five, etc. MDR assemblies.

In some embodiments, the lift 10 may include an adjustment mechanism 14, which may be disposed at the base of the frame 12. In some embodiments, the adjustment mechanism 14 may be operably connected to the one or more MDR assemblies 100A, 100B via one or more cables 16A, 16B. In some embodiments, the adjustment mechanism 14 may be configured to raise and/or lower the one or more MDR assemblies 100A, 100B on or within the frame 12 (e.g., to access objects placed at different elevations within the frame 12). In some embodiments, the adjustment mechanism 14 may include a motor 18 operably coupled to the one or more cables 16A, 16B and may be configured to raise and/or lower the one or more MDR assemblies 100A, 100B via the motor 18. A variety of mechanisms and devices may be used to change the elevation of the MDR assemblies 100A, 100B within the frame 12.

Figure 1D:
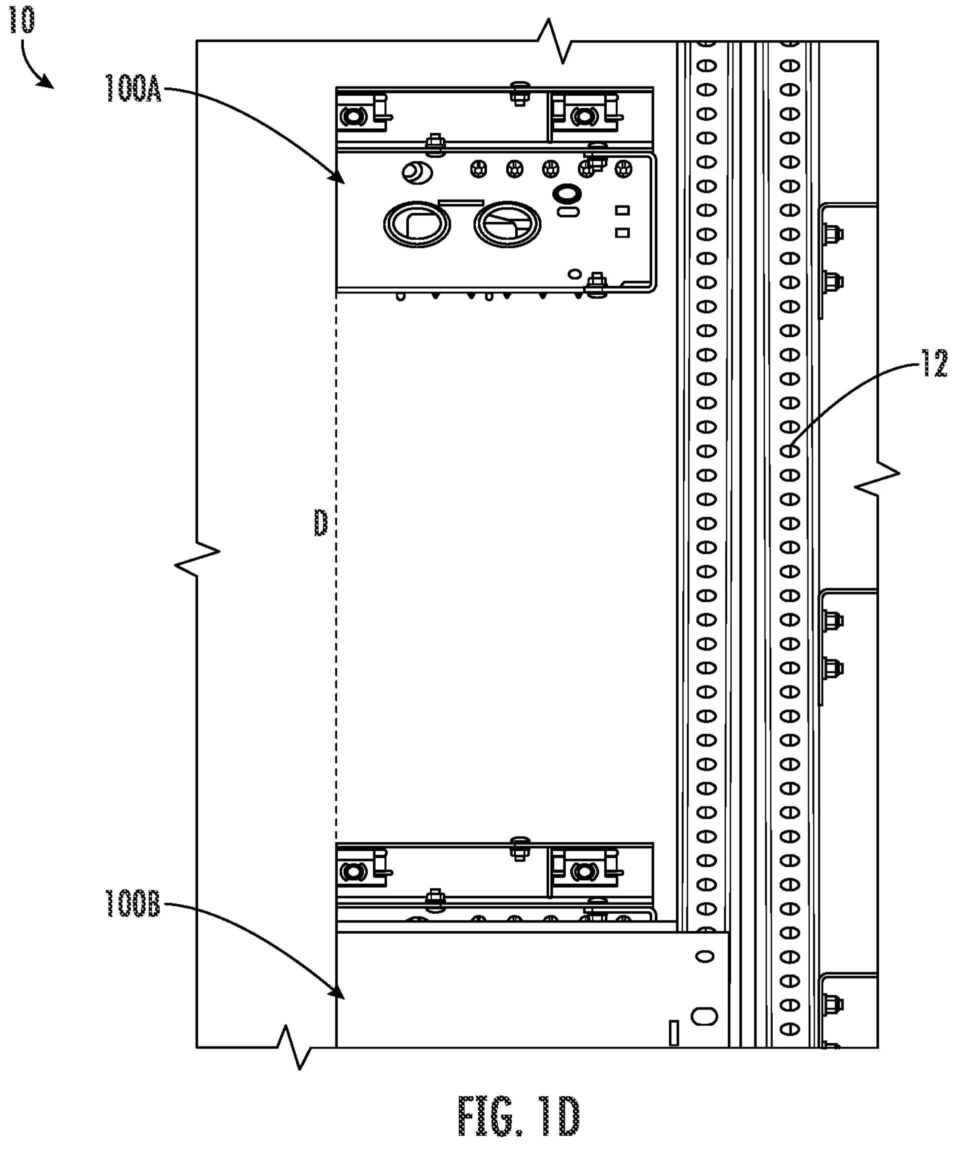
FIG. 1D shows a side view of an example lift for an example ASRS system in accordance with various embodiments of the present disclosure.

In some embodiments, the MDR assembly 100A may include one or more drawers 102A, 102B. In some embodiments, the one or more drawers 102A, 102B may be disposed on an underside of the MDR assembly 100A. In some embodiments, the one or more drawers 102A, 102B may be electrical drawers on which one or more electrical components of the MDR assembly 100A may be mounted. For example, motor control cards, wiring terminals, and/or communication devices may be disposed on or within the drawers 102A, 102B. The drawers 102A, 102B may be moved between an "open" position, as shown in FIG. 1B, and a "closed" position, as shown in FIG. 1C. A side view of the lift 10 is shown in FIG. 1D, showing the distance D between the MDR 100A and the MDR 100B when the drawers 102A, 102B are in the closed position.

FIG. 1B further illustrates roller frames such as a roller frame 11.

As shown in FIG. 1C, a distance D may be defined between the MDR assembly 100A and the MDR assembly 100B. In some embodiments, when the drawers 102A, 102B are in the open position, the distance D may be reduced. The shorter the distance D between the MDR assemblies 100A, 100B, the closer the MDR assemblies 100A, 100B come to crashing into each other. Hence, when the drawers 102A, 102B are deployed, in some embodiments, the MDR assemblies 100A, 100B may come closer to colliding. Similarly, as previously mentioned, description applied to the MDR 100A also applied to the MDR 100B unless otherwise stated, and the MDR 100B.

Figure 2A:
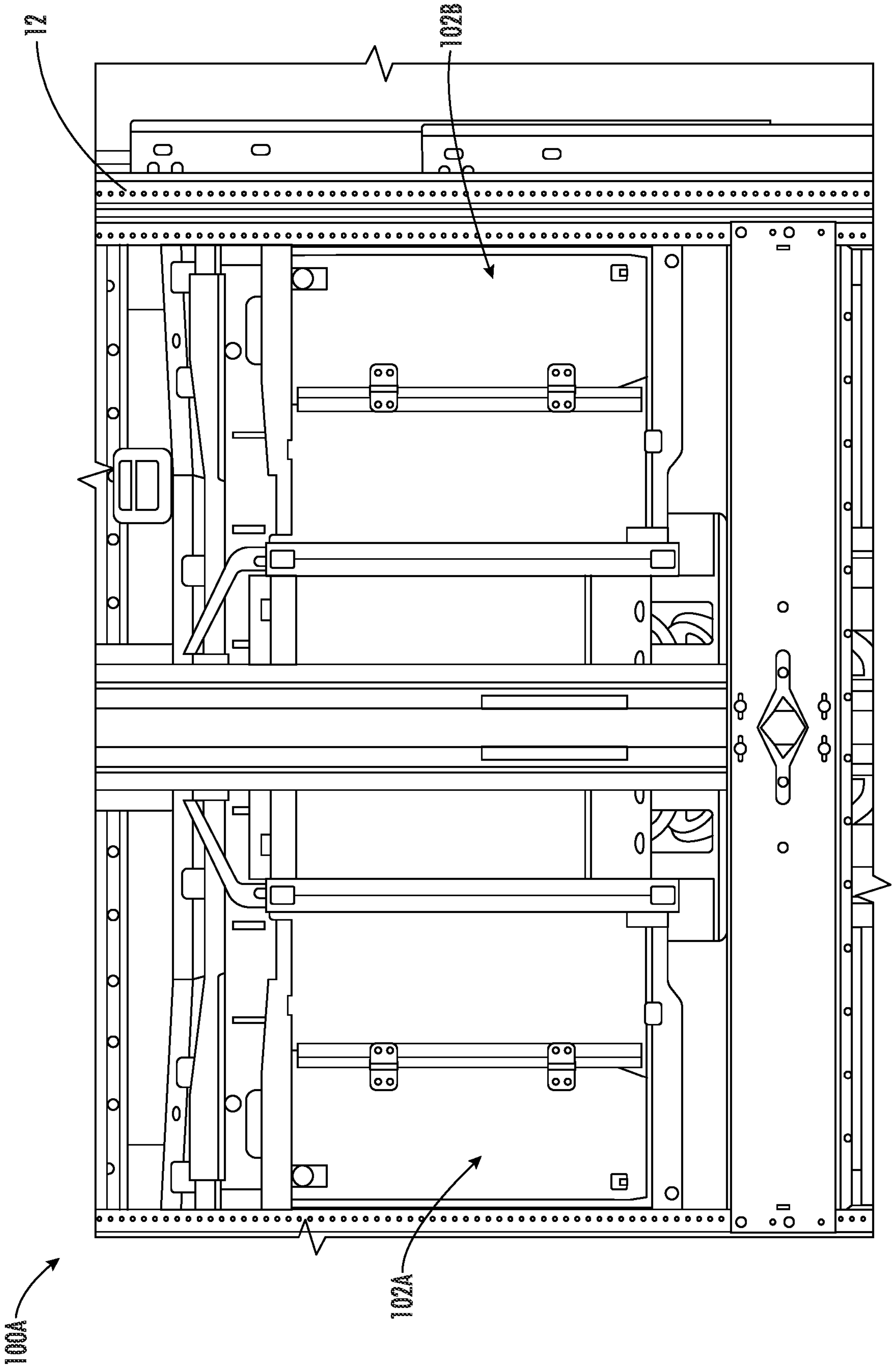
FIG. 2A shows a bottom plan view of an example MDR assembly in accordance with various embodiments of the present disclosure.

FIG. 2A shows a bottom plan view of an example MDR assembly 100A, according to some embodiments. The MDR assembly 100A as shown in FIG. 2A has the drawers 102A, 102B both closed. In some embodiments, the MDR assembly 100A may include one or more sensing devices 104A, 104B. In some embodiments, the one or more sensing devices 104A, 104B may be photoeye sensors that use one or more beams of light to detect potential collisions. A detail view of an example sensing device 104A is shown in FIG. 2C.

Figure 2B:
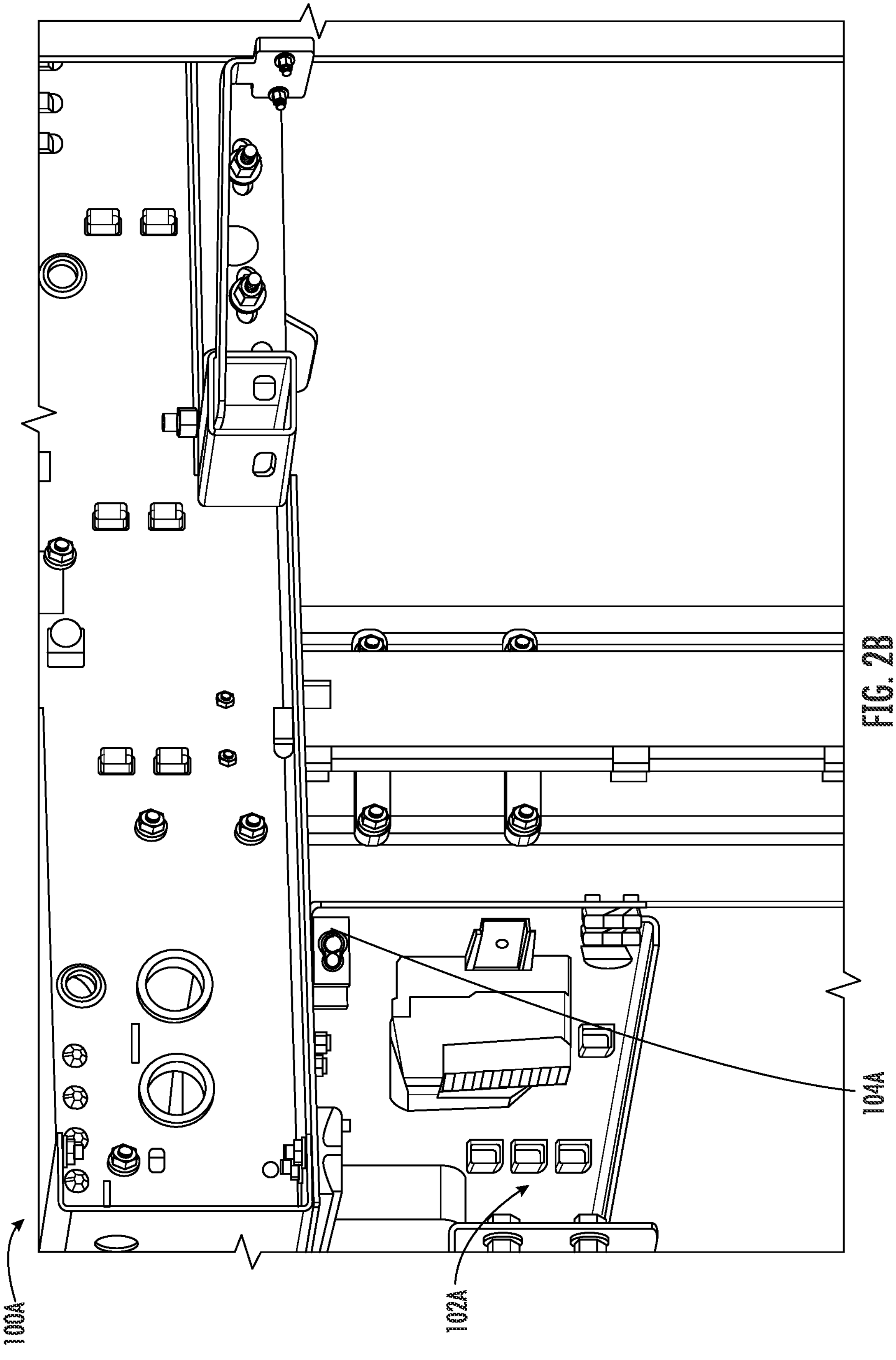
FIG. 2B shows a side angled view of an example MDR assembly in accordance with various embodiments of the present disclosure.

When the drawers 102A, 102B are in the closed position (as shown in at least FIG. 2A), the one or more sensing devices 104A, 104B may be facing “downward” (i.e., in the direction of the MDR assembly 100B in the case of MDR assembly 100A, or in the direction of the adjustment mechanism 14 in the case of MDR assembly 100B). When the drawers 102A, 102B are in the open position (as shown in at least FIG. 2B), the one or more sensing devices 104A, 104B may be facing “outward,” as shown in FIG. 2B (i.e., across at least a face-such as the underside—of the MDR assembly 100A).

Figure 2C:
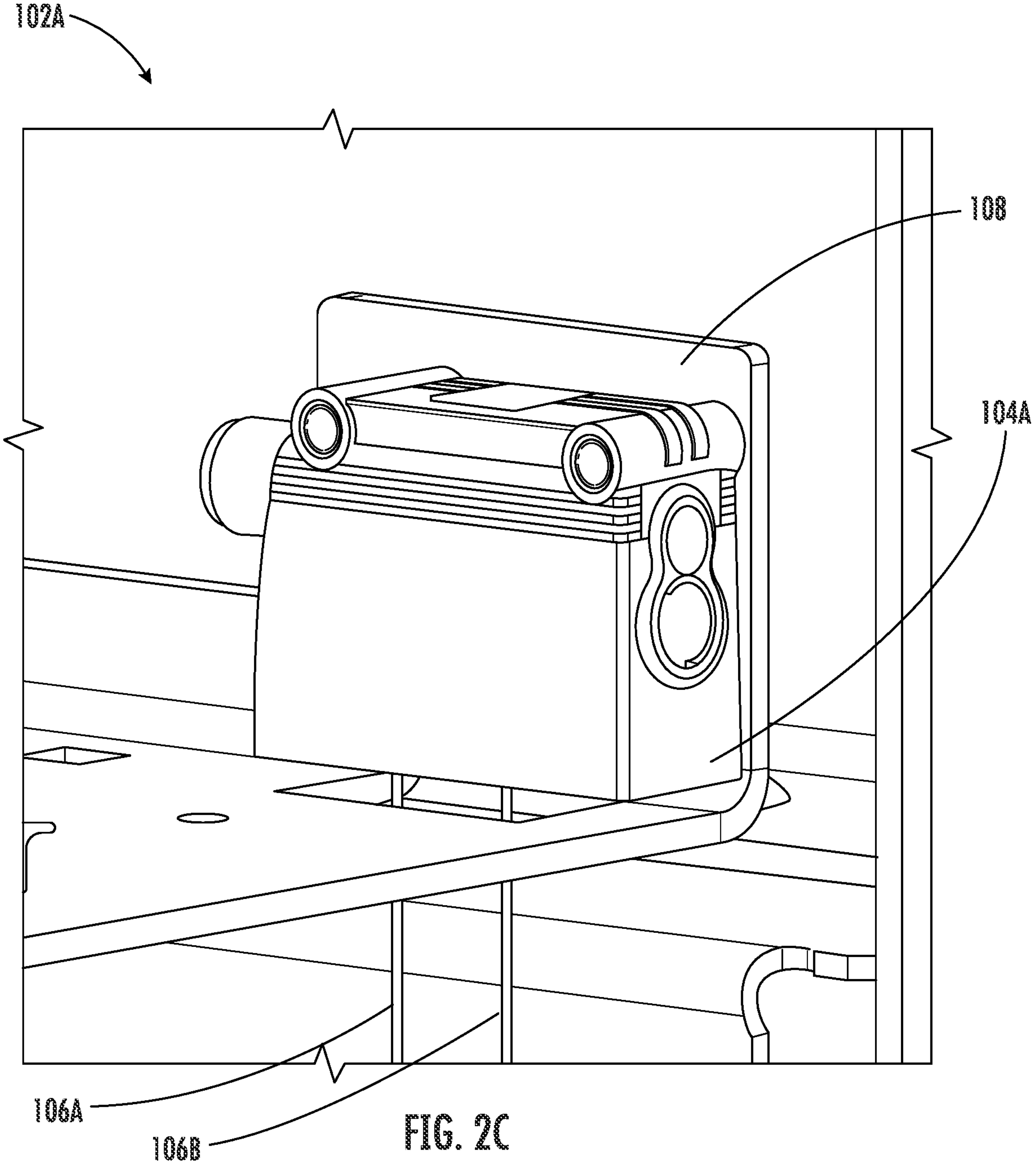
FIG. 2C shows a detail view of an example sensing device of an example MDR assembly in accordance with various embodiments of the present disclosure.
Figure 2D:
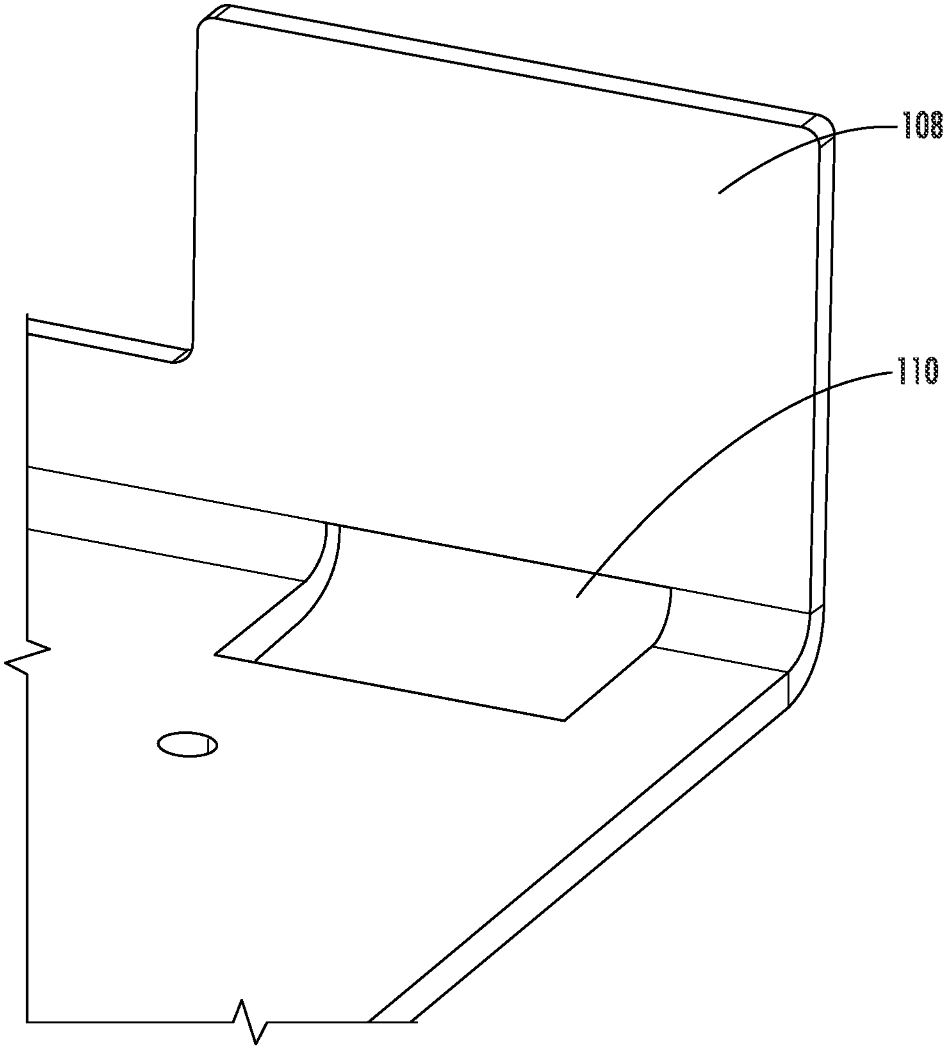
FIG. 2D shows a detail view of an example mounting frame of an example MDR assembly in accordance with various embodiments of the present disclosure.

As shown in at least FIG. 2C, in some embodiments, the one or more sensing devices 104A, 104B may be configured to emit one or more beams of light 106A, 106B for aforementioned purposes of detection. It will be understood that description that applies to one sensing device 104A, may apply similarly to other sensing devices 104B. In some embodiments, the MDR assembly 100A may include a mounting bracket 108. In some embodiments, the mounting bracket 108 may include one or more slots 110. In some embodiments, the one or more sensing devices 104A, 104B may be mounting on the mounting plate 108 and configured to direct the one or more beams of light 106A. 106B through the one or more slots 110.

Although two sensing devices 104A, 104B are shown in the various figures, and although they are shown as being only on the drawer 102A, the MDR assembly 100A may include greater or fewer than two sensing devices 104A, 104B, and the sensing devices may be disposed on the first and/or the second drawers 102A, 102B.

Figure 3A:
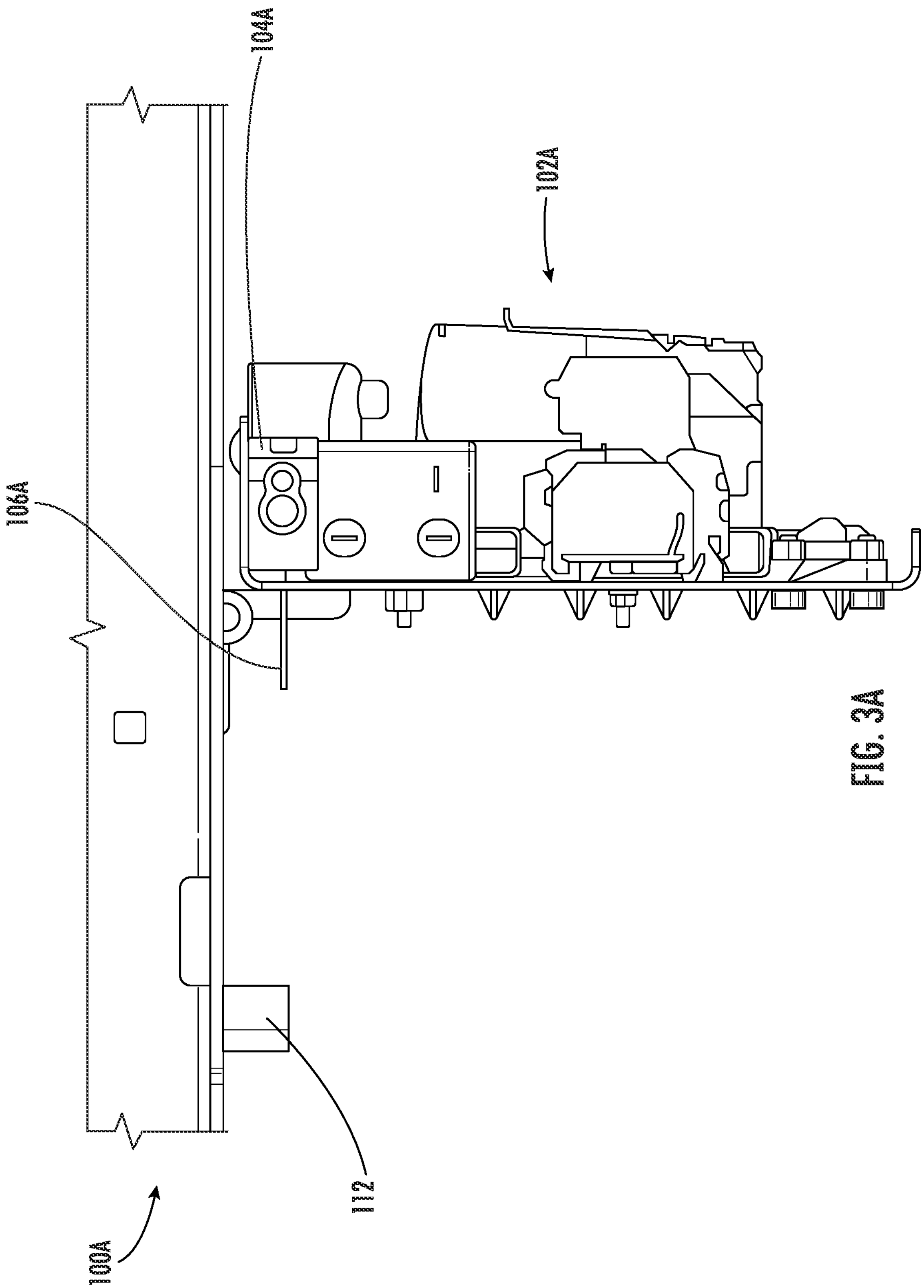
FIG. 3A shows an elevated side view of an example MDR assembly in accordance with various embodiments of the present disclosure.
Figure 3B:
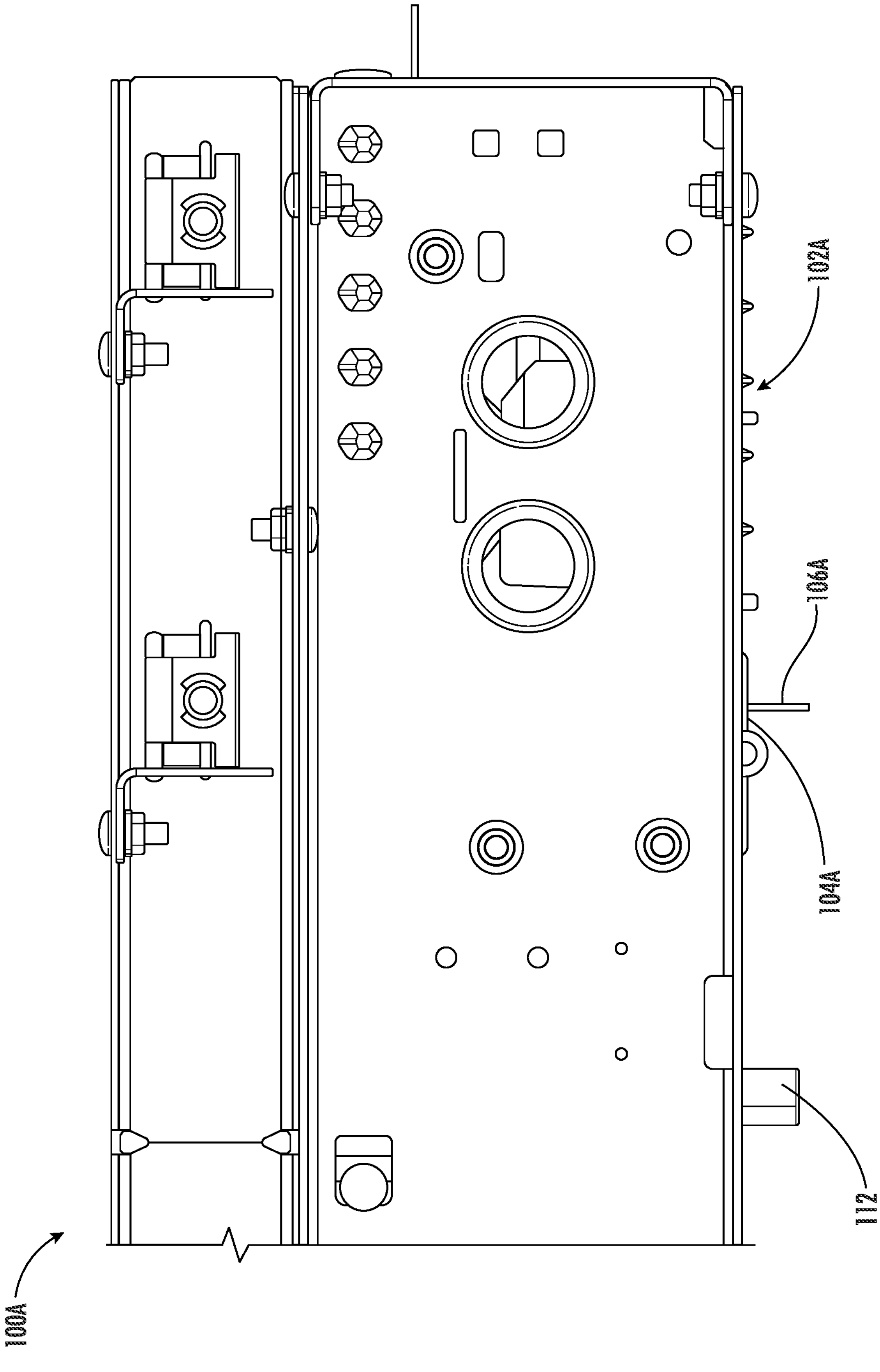
FIG. 3B shows an elevated side view of an example MDR assembly in accordance with various embodiments of the present disclosure.

Referring now to FIG. 3A, in some embodiments, the MDR assembly 100A may include a sensing bracket 112. In some embodiments, the sensing bracket 112 may be configured to “block” the one or more sensing devices 104A, 104B when the drawer 102A is in the “open” position. In some embodiments, when the sensing bracket 112 blocks the one or more sensing devices 104A, 104B, the MDR assembly 100A may be restricted from moving. That is, when the drawer 102A is in the open position, the MDR assembly 100A may be restricted from moving, for example, within the frame 12 of the lift 10. As shown in FIG. 3B, when the drawer 102A is in the “closed” position, the one or more sensing devices 104A, 104B may be configured not to intersect the sensing bracket 112, such that the MDR assembly 100A is not restricted from moving (for example, within the frame 12 of the lift 10).

Example Methods of Use

Figure 4:
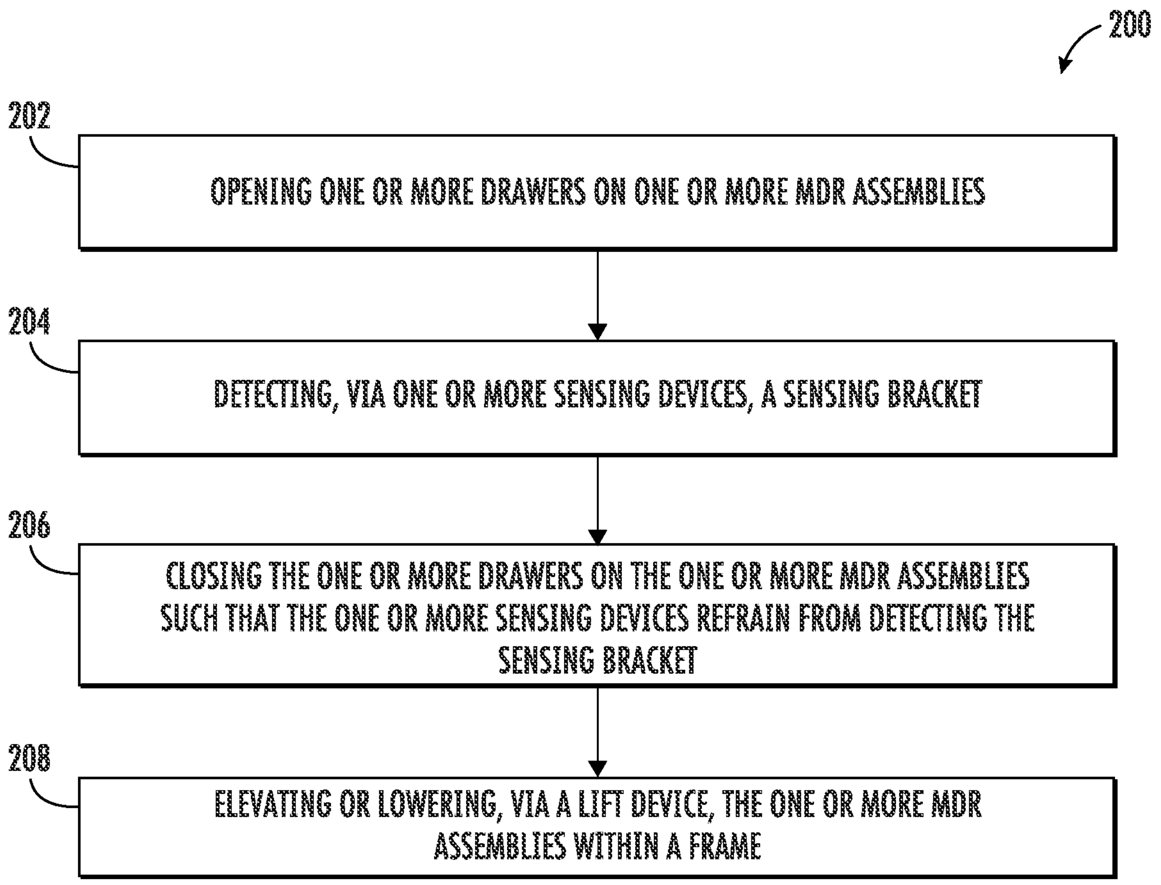
FIG. 4 shows a flow chart illustrating an example method of use in accordance with various embodiments of the present disclosure.

FIG. 4 shows a flow chart illustrating an example method 200 of using an example lift 10 of an ASRS and/or example MDR assembly 100A, 100B. The method 200 is described with particular reference to the MDR assembly 100A, but it may be implemented using any number of suitable systems, assemblies, and/or devices, as desired.

In some embodiments, the method 200 may include a step 202 of opening one or more drawers on one or more MDR assemblies. In some embodiments, the method 200 may include a step 204 of detecting, via one or more sensing devices a sensing bracket. In some embodiments, the method 200 may include a step 206 of closing the one or more drawers on the one or more MDR assemblies such that the one or more sensing devices refrain from detecting the sensing bracket. In some embodiments, the method 200 may include a step 208 of elevating or lowering, via a lift device, the one or MDR assemblies within a frame.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A motorized drive roller (MDR) assembly comprising:
a roller frame;
one or more drawers configured to move between an open position and a closed position, wherein the one or more drawers are fixedly attached to the roller frame;
a sensing bracket:
one or more sensing devices configured to detect potential collision and whether the one or more drawers are in the open position or the closed position; and
a plurality of rollers disposed on or within the roller frame,
wherein the MDR assembly is operably engaged with a lift mechanism configured to raise or lower the MDR assembly to one or more elevations,
wherein, when the one or more drawers are in the open position, the one or more sensing devices are configured to detect the sensing bracket and prevent the lift mechanism from raising or lowering the MDR assembly, and
wherein, when the one or more drawers are in the closed position, the one or more sensing devices are configured to refrain detecting the sensing bracket.

2. The MDR assembly of claim 1, wherein the one or more sensing devices comprises one or more photoeye sensors.

3. The MDR assembly of claim 1, wherein, when the one or more sensing devices detect the sensing bracket, the one or more sensing devices are further configured to prevent the lift mechanism from raising or lowering the MDR assembly.

4. The MDR assembly of claim 1, wherein the plurality of rollers comprises one or more active drive rollers and one or more passive idler rollers, and wherein the one or more active drive rollers are configured to drive the one or more passive idler rollers.

5. The MDR assembly of claim 1, wherein the one or more drawers comprise one or more electrical drawers.

6. The MDR assembly of claim 1, further comprising one or more mounting plates disposed on the one or more drawers or within the one or more drawers and comprising one or more slots, wherein the one or more sensing devices are mounted to the one or more mounting plates, and wherein the one or more sensing devices are configured to direct one or more beams of light through the one or more slots.

7. A system comprising:

a frame;

one or more motorized drive roller (MDR) assemblies disposed on the frame or within the frame, wherein the one or more MDR assemblies comprise:

a roller frame;

one or more drawers configured to move between an open position and a closed position, wherein the one or more drawers are fixedly attached to the roller frame;

a sensing bracket; and one or more sensing devices fixedly attached to at least one of the one or more drawers, wherein the one or more sensing devices are configured to detect potential collision and whether the one or more drawers are in the open position or the closed position;

a plurality of rollers disposed on the roller frame or within the roller frame; and a lift mechanism operably engaged to the one or more MDR assemblies and configured to raise or lower the one or more MDR assemblies to one or more elevations within the frame, wherein, when the one or more drawers are in the open position, the one or more sensing devices are configured to detect the sensing bracket and prevent the lift mechanism from raising or lowering the one or more MDR assemblies, and wherein, when the one or more drawers are in the closed position, the one or more sensing devices are configured to refrain detecting the sensing bracket.

8. The system of claim 7, wherein the one or more sensing devices comprises one or more photoeye sensors.

9. The system of claim 7, wherein, when the one or more sensing devices detect the sensing bracket, the one or more sensing devices are further configured to prevent the lift mechanism from raising or lowering the one or more MDR assemblies.

10. The system of claim 7, wherein the plurality of rollers comprises one or more active drive rollers and one or more passive idler rollers, and wherein the one or more active drive rollers are configured to drive the one or more passive idler rollers.

11. The system of claim 7, wherein the one or more drawers comprise one or more electrical drawers.

12. The system of claim 7, wherein the lift mechanism comprises one or more cables disposed on the frame or within the frame.

13. The system of claim 7, wherein the one or more MDR assemblies comprise a first MDR assembly and a second MDR assembly, and wherein the first MDR assembly and the second MDR assembly are separated by a distance D within the frame.

14. A method of using a system, the method comprising:

opening one or more drawers on one or more motorized drive roller (MDR) assemblies;

detecting, via one or more sensing devices, a sensing bracket when one or more drawers are in an open position;

closing the one or more drawers on the one or more MDR assemblies such that the one or more sensing devices refrain from detecting the sensing bracket; and elevating or lowering, via a lift mechanism, the one or more MDR assemblies within a frame, wherein the lift mechanism is operably engaged to the one or more MDR assemblies, and wherein the one or more sensing devices are configured to prevent the lift mechanism from raising or lowering the one or more MDR assemblies when the one or more drawers are in the open position.

* * * * *